(12) United States Patent
Rohr et al.

(10) Patent No.: US 7,351,677 B2
(45) Date of Patent: Apr. 1, 2008

(54) PROCESS FOR REGENERATING A NITROGEN OXIDES STORAGE CATALYST

(75) Inventors: Friedemann Rohr, Hanau (DE); Peter Kattwinkel, Marienheide (DE); Stefan D. Peter, Eggenstein-Leopoldshafen (DE); Thomas Kreuzer, Karben (DE); Egbert Lox, Hochwaldhausen (DE)

(73) Assignee: Umicore AG & Co. KG, Hanau (DE)

( * ) Notice: Subject to any disclaimer, the term of this patent is extended or adjusted under 35 U.S.C. 154(b) by 456 days.

(21) Appl. No.: 10/630,303

(22) Filed: Jul. 29, 2003

(65) Prior Publication Data

US 2004/0055285 A1    Mar. 25, 2004

(30) Foreign Application Priority Data

Jul. 31, 2002    (EP) ................................. 02017245

(51) Int. Cl.
*B01J 20/34*    (2006.01)
(52) U.S. Cl. ...................................................... 502/38
(58) Field of Classification Search ................ 502/29, 502/30, 31, 38; 423/235, 239.1
See application file for complete search history.

(56) References Cited

U.S. PATENT DOCUMENTS 6,143,261 A * 11/2000 Lissy et al. ............. 423/213.5
6,350,421 B1 * 2/2002 Strehlau et al. .......... 423/213.2
6,419,890 B1 * 7/2002 Li ............................ 423/239.1

FOREIGN PATENT DOCUMENTS

| DE | 198 01 815 A | 7/1999 |
| DE | 101 26 828 A | 1/2002 |
| EP | 0 598 916 A | 6/1994 |
| EP | 1 167 711 A | 1/2002 |
| EP | 1 386 656 A1 | 2/2004 |

OTHER PUBLICATIONS

European Search Report EP 02 01 7245.

* cited by examiner

*Primary Examiner*—Edward M. Johnson
(74) *Attorney, Agent, or Firm*—Kalow & Springut LLP

(57) ABSTRACT

The present invention provides a process and a device for regeneration of a nitrogen oxide storage catalyst in the exhaust system of a diesel engine. The process comprises a first and a second regeneration strategy. The first regeneration strategy is applied when the exhaust gas temperature is above a threshold value and comprises changing the air/fuel-ratio from a lean to a rich value during a first regeneration period. The second regeneration strategy is applied when the exhaust gas temperature is below a threshold value and comprises switching the air/fuel-ratio back and forth between lean and rich air/fuel-ratios, forming a sequence of between 2 and 10 rich pulses and between 2 and 10 lean pulses during a second regeneration period.

11 Claims, 2 Drawing Sheets

PROCESS FOR REGENERATING A NITROGEN OXIDES STORAGE CATALYST

FIELD OF INVENTION

The present invention relates to cleaning exhaust gas of a diesel engine. More precisely, it is directed to lowering the content of nitrogen oxide contained in the exhaust gas by using a nitrogen oxide storage catalyst.

BACKGROUND OF INVENTION

Diesel engines belong to the category of lean-burn engines and are operated with lean air/fuel-ratios. The air/fuel-ratio is calculated from the mass of air supplied to the engine in relation to the mass of fuel. In normal fuels for internal combustion engines such as diesel engines or gasoline engines, 14.6 kilograms of air are needed for the complete combustion of 1 kilogram of fuel, which is an air/fuel-ratio of approximately 14.6. Air/fuel-ratios above that value are lean, and air/fuel-ratios below that value are rich. The exhaust gas leaving the engine exhibits the same air/fuel-ratio as the air/fuel-mixture supplied to the engine, provided that no adsorption or desorption processes occur within the engine.

Frequently the composition of the air/fuel-mixture or of the exhaust gas is characterized by a lamda ($\lambda$) value. $\lambda$ is defined as the air/fuel-ratio normalized to stoichiometric conditions. For stoichiometric combustion of the fuel, the $\lambda$-value of the air/fuel-mixture supplied to the engine must be equal to 1.

Diesel engines are operated with lean air/fuel-mixtures with $\lambda$-values above 1, usually with $\lambda$-values of between 1.5 and 4. The exhaust gas of diesel engines contains a high oxygen concentration of between 5 and 15 volume-%, compared to gasoline engines, which contain only approximately 0.7 volume-% oxygen.

Diesel engine exhaust gases contain harmful substances such as: carbon monoxide (CO), unburned hydrocarbons (HC), nitrogen oxides ($NO_x$), and soot particles. The nitrogen oxides are a mixture of different oxides of nitrogen. The major component is nitrogen monoxide, which is from 60 to 90 volume-% of the total nitrogen oxides content of the exhaust gas; the balance is mainly nitrogen dioxide. The exact composition depends on the engine type and the operating conditions.

Carbon monoxide and unburned hydrocarbons can be effectively converted to harmless substances by contacting the exhaust gas with a diesel oxidation catalyst. Unfortunately, due to the high oxygen content of diesel exhaust gas, it is difficult to convert the nitrogen oxides to harmless nitrogen gas. For coping with this problem, nitrogen oxide storage catalysts have been developed that adsorb nitrogen oxide during lean operating phases, then release nitrogen oxides and convert them to harmless substances during rich exhaust gas operating phases.

Nitrogen oxide storage catalysts are composed of mainly a platinum catalyst and a storage component. The storage component is usually a basic metal oxide, such as an oxide of an element selected from the group consisting of alkali metals, alkaline earth metals, rare earth metals and mixtures thereof. Preferred storage components are barium oxide and strontium oxide.

The accepted theory of nitrogen oxide storage catalyst function is as follows. During lean operating phases, nitrogen monoxide contained in the exhaust gas is oxidized by the platinum catalyst to nitrogen dioxide. Under the humid atmosphere of the exhaust gas, nitrogen dioxide is trapped by the storage component in the form of nitrates. When the storage capacity of the nitrogen oxide storage catalyst has been exhausted, it needs to be regenerated to restore its original storage capacity. Regeneration is achieved by changing the air/fuel-ratio of the air/fuel-mixture fed to the engine to rich values. Rich exhaust gas establishes reducing conditions under which adsorbed nitrogen oxides are desorbed, and with the help of carbon monoxide and hydrocarbons contained in the rich exhaust gas, the nitrogen oxides are converted to nitrogen, carbon dioxide and water by the platinum catalyst.

The storage phase is defined as the time during which the nitrogen oxide storage catalyst can adsorb nitrogen oxide, and is usually between 1 and 5 minutes, depending on the nominal storage capacity of the nitrogen oxide storage catalyst and the concentration of nitrogen oxide in the exhaust gas. After the storage phase, the catalyst needs to be regenerated. Regeneration is accomplished by lowering the $\lambda$-value of the exhaust gas to between 0.9 and 0.95. From between 5 and 10 seconds of regeneration time is needed to restore the catalyst storage capacity. Thus, storage and regeneration alternate frequently during operation of the engine.

Diesel engines require lean air/fuel-mixtures for stable operation. It was only with the recent development of new diesel engines such as common rail engines and pump-injector engines, that it became possible to operate diesel engines with rich air/fuel-mixtures for a short period of time. This development made it possible to use nitrogen oxide storage catalysts for exhaust gas cleaning diesel engines, as well as lean operated gasoline engines.

Changing the air/fuel ratio from lean to rich to regenerate the nitrogen oxide storage catalyst during driving must be performed in such a way that does not affect the driving comfort. This restricts the maximum permissible regeneration time to approximately 8 to 20 seconds. This time period is sufficient to regenerate the nitrogen oxide storage catalyst completely, provided that the exhaust gas temperature is high enough.

Nitrogen oxide storage catalyst regeneration functions well above a threshold temperature between approximately 170° C. and 250° C., but regeneration is difficult below this temperature range. Newly developed diesel engines exhibit relatively low average exhaust gas temperatures. This causes problems with regenerating nitrogen oxide storage components, especially after prolonged storage periods. The conventional regeneration procedure involves brief rich periods during which the stored nitrogen oxide is released and subsequently converted to nitrogen. However, at low temperatures a dsubstantial amount of the nitrogen oxide being released leaves the converter unreduced, probably due to slow kinetics of the chemical reactions involved in nitrogen oxide conversion. Furthermore, the storage components are only partly cleared, and some nitrates remain in the storage material, lowering the storage capacity for the next storage cycle. The situation is aggravated even further by HC and CO breakthroughs during the rich phase, common under these conditions. Heating measures in lean conditions by post injection are ineffective at improving the performance of nitrogen oxide storage catalysts, since the temperature increase achieved drops very quickly after switching back to normal operation mode.

Therefore, a need exists for improving the regeneration of nitrogen oxide storage catalysts, especially at low exhaust gas and catalyst temperatures.

BRIEF SUMMARY OF THE INVENTION

The present invention relates to regeneration strategies for regenerating nitrogen oxide storage catalysts. The process according to the present invention provides a new strategy for regenerating the nitrogen oxide storage catalyst and results in improved nitrogen oxide conversion at low exhaust gas temperatures. A first regeneration strategy is applied when the exhaust gas temperature of the diesel engine is above a threshold value and a second regeneration strategy is applied when the exhaust gas temperature is below the threshold value. The threshold value is typically between 170° C. and 250° C. but is dependent on the formulation of the catalyst and its aging status.

One embodiment of the present invention is a process for regeneration of a nitrogen oxide storage catalyst. This process comprises the steps of: (a) applying a first regeneration strategy when the exhaust gas temperature is above a threshold temperature, wherein said first regeneration strategy comprises changing a lean air/fuel-ratio to a rich air/fuel-ratio during a first regeneration period; and (b) applying a second regeneration strategy when the exhaust gas temperature is below said threshold temperature, wherein said second regeneration strategy comprises switching the air/fuel-ratio between a lean air/fuel-ratio and a rich air/fuel-ratio back and forth forming a sequence of rich pulses and lean pulses, and said sequence has between 2 and 10 rich pulses and between 2 and 10 lean pulses during a second regeneration period.

The second regeneration strategy improves the overall performance of the exhaust gas cleaning process considerably. At temperatures below the threshold value, conventional regeneration strategies are unable to fully restore the original storage capacity of the catalyst. This leads to strong emissions of carbon monoxide and hydrocarbons during the regeneration period. When a nitrogen oxide storage catalyst is operated over a prolonged period at low exhaust gas temperatures, regeneration gets worse, and after each regeneration the residual nitrogen oxides remaining on the catalyst increases.

In a further embodiment, the present invention provides a process for regeneration of a nitrogen oxide storage catalyst. This process comprises the steps of: (a) adsorbing nitrogen oxides contained in an exhaust gas by a storage catalyst during normal operating conditions of an engine; (b) desorbing the nitrogen oxides and converting the nitrogen oxides to harmless substances by lowering the air/fuel-ratio to a rich air/fuel-ratio value during a regeneration period; and (c) switching the air/fuel-ratio back and forth between a lean air/fuel-ratio and a rich air/fuel-ratio forming a sequence of lean pulses and rich pulses, and said sequence has between 2 and 10 rich pulses and between 2 and 10 lean pulses during the regeneration period.

In still a further embodiment, the present invention provides a device for regeneration of a nitrogen oxide storage catalyst, said device comprising: (a) a means for applying a first regeneration strategy when the exhaust gas temperature is above a threshold value, said first regeneration strategy comprising changing the air/fuel-ratio from a lean air/fuel-ratio to a rich air/fuel-ratio value during a first regeneration period; and (b) a means for applying a second regeneration strategy when the exhaust gas temperature is below said threshold value, said second regeneration strategy comprising a means for switching the air/fuel-ratio between a lean air/fuel-ratio and a rich air/fuel-ratio back and forth forming a sequence of rich pulses and lean-pulses with between 2 and 10 rich pulses and between 2 and 10 lean pulses during a second regeneration period.

It has been observed that in some instances, the first regeneration strategy can be omitted. In that case, the pulsed regeneration strategy is used under all operation conditions of the diesel engine, even when the exhaust gas temperature is high.

BRIEF DESCRIPTION OF THE DRAWINGS

The preferred embodiments of the present invention have been chosen for the purposes of illustration and description but are not intended to restrict the scope of the invention in any way. The benefits of the preferred embodiments of certain aspects of the invention are shown in the accompanying figures, wherein.

DETAILED DESCRIPTION OF THE INVENTION

Figure 1:
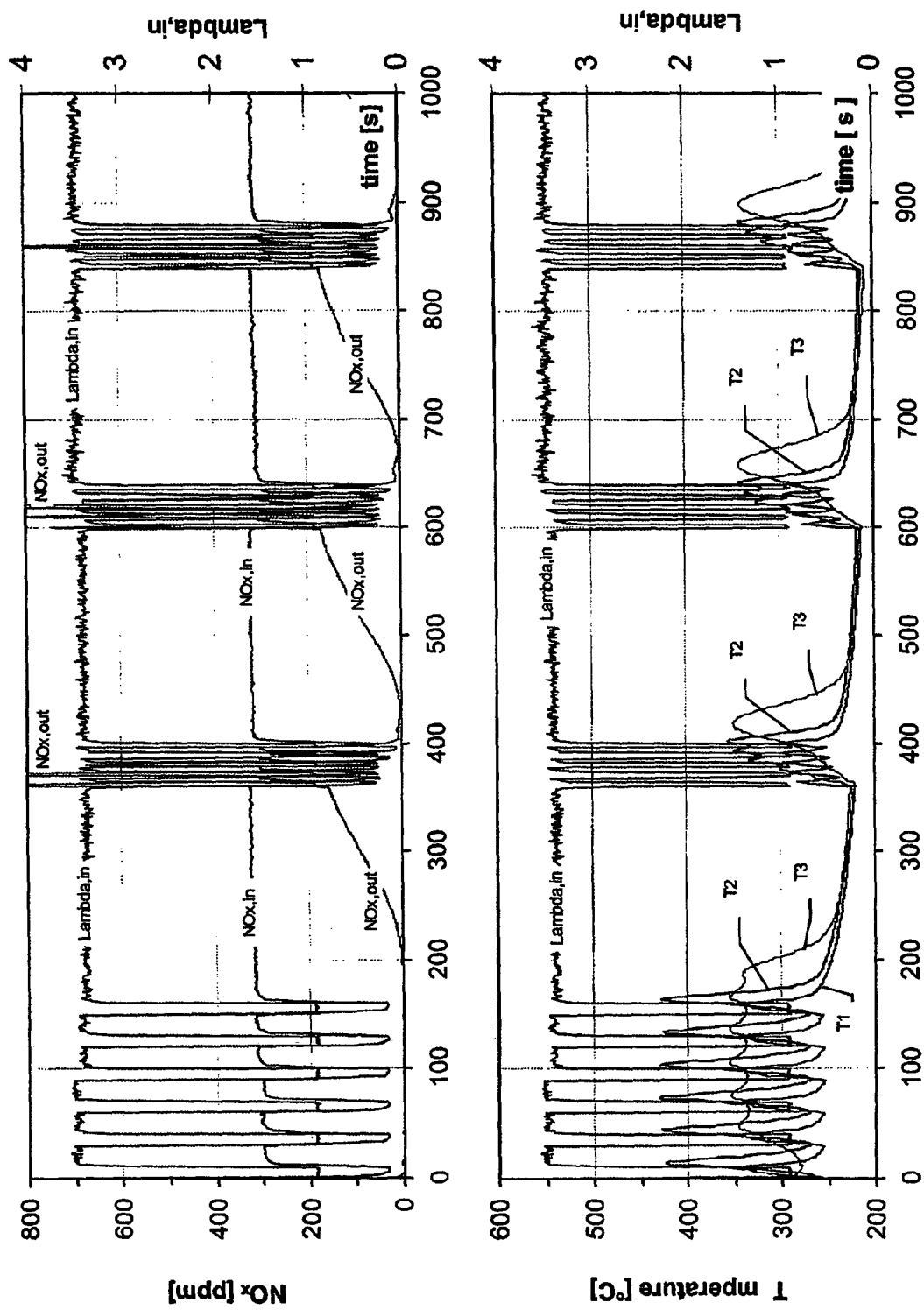
FIG. 1 illustrates operation of a nitrogen oxide storage catalyst arranged in the exhaust gas system of a diesel engine using the novel pulsed regeneration strategy according to the invention at low exhaust gas temperatures.

The present invention will now be described in connection with preferred embodiments. These embodiments are presented to aid in an understanding of the present invention and are not intended, and should not be construed, to limit the invention in any way. All alternatives, modifications and equivalents that may become apparent to those of ordinary skill upon reading this disclosure are included within the spirit and scope of the present invention. This disclosure is not a primer on automotive catalyst regeneration and basic concepts known to those skilled in the art have not been set forth in detail.

The present invention provides a process for regeneration of a nitrogen oxide storage catalyst comprising a first and a second regeneration strategy. The first regeneration strategy is applied when the exhaust gas temperature is above a threshold value and comprises changing the air/fuel-ratio from a lean to a rich value during a first regeneration period. The second regeneration strategy is applied when the exhaust gas temperature is below said threshold value and comprises switching the air/fuel-ratio back and forth between lean and rich air/fuel-ratios, forming a sequence of between 2 and 10 rich pulses and between 2 and 10 lean pulses during a-second regeneration period.

The conventional procedure for the regeneration of a nitrogen oxide storage catalyst involves running the catalyst in a rich air/fuel-ratio for a short time, typically between 5 and 20 seconds. The engine management continuously monitors the state of the storage catalyst. If the storage performance of the catalyst drops below a critical value, regeneration is initiated. The engine switches from lean conditions where $\lambda$ is between 1.5 and 4, to rich conditions where $\lambda$ is between 0.98 and 0.8, without change of torque so that the driver does not recognize the start of regeneration. This procedure yields poor results at gas temperatures below a certain threshold. This threshold temperature lies between 170° C. and 250° C., depending on the catalyst used and its aging state.

A substantially improved removal of the nitrous species from the catalyst combined with highly efficient conversion to nitrogen at low exhaust gas temperatures is achieved in the present invention by means of a pulsed regeneration procedure. The catalyst is regenerated using a sequence of rich pulses and lean pulses. The engine management switches the air/fuel-ratio supplied to the engine back and forth between the normal lean operating point and a corresponding torque-neutral rich operating point. The $\lambda$ values are the same as for the conventional regeneration procedure.

The duration of the pulses (pulse width) is between 2 and 10 seconds and may be the same or different for the rich and the lean pulses. The ratio of the pulse width of the lean pulses to the pulse width of the rich pulses may lie between 5:1 and 1:5. Moreover, the pulse widths of the pulses may be decreased stepwise or continuously from the beginning to the end of the second regeneration period.

During the pulsed regeneration a progressive increase of the catalyst temperature is observed, which facilitates carbon monoxide and hydrocarbon conversion, as well as the release and reduction of the nitrous oxides. A number between 2 and 10 rich pulses and between 2 and 10 lean pulses have proven sufficient for complete regeneration of the catalyst.

The key factor for pulsed regeneration seems to be the combination of heating and regeneration. By switching between lean and rich air/fuel-ratios, a steady oxygen supply is maintained and may help burn the HC deposited on the catalyst during the rich pulses. The increased temperature then speeds up the relevant chemical reactions.

In conventional regeneration, a regeneration period of approximately between 5 and 20 seconds cannot be prolonged considerably, without loosing stability of the engine operation and driving comfort. In contrast, it was found that pulsed regeneration of the present invention allows longer regeneration periods without the detrimental effects observed during conventional regeneration.

EXAMPLES

The present invention may be more readily understood through the following examples, which are provided by way of illustration and are not intended to limit the invention.

Example 1

The novel pulsed regeneration strategy of the invention was applied during the operation of a nitrogen oxide storage catalyst arranged in the exhaust system of a diesel engine. The diesel engine was a common rail engine with a power rating of 90 kW and a displacement volume of 2.2 liters. The nitrogen oxide storage catalyst consisted of a honeycomb carrier with a diameter 14.38 cm (5.66 inches), length 15.24 cm (6 inches) and volume 2.47 liters. The cell density of the carrier was 62 $cm^{-2}$ (400 $inches^{-2}$).

The storage catalyst had been applied to this catalyst carrier with a concentration of 280 g/liter of honeycomb carrier. The storage component was barium oxide. The storage catalyst further contained platinum and rhodium in a weight ratio of 10:1 and a combined concentration of 3.88 g/liter (110 $g/ft^3$).

FIG. 1 shows measurement scans of various quantities of the exhaust gas and of the catalyst over a 1000 second operation period of the diesel engine. The following quantities were measured online:

$\lambda$ value before the catalyst (Lambda, in); measured with a $\lambda$ sensor Nitrogen oxide concentrations in the exhaust gas before ($NO_x$, in) and after the catalyst ($NO_x$, out); measured with a chemo-luminescence detector Catalyst temperature measured at entrance of catalyst (T1)

Catalyst temperature midway of the catalyst (T2)

Catalyst temperature measured at exit of catalyst (T3)

During the test, the engine was operated at a constant 1500 rpm rotation speed, without exhaust gas recirculation. This resulted in a space velocity of the exhaust gas relative to the catalyst of 30,000 $h^{-1}$. At the start of the test, the catalyst was conditioned by operating the diesel engine with 5 rich pulses and 5 lean pulses with a duty cycle of 20/10. The amplitudes of the pulses were switched between 3.3 and 0.9. After that the engine was operated for 200 seconds with a $\lambda$ value of approximately 3.3, the storage phase. During the storage phase, nitrogen oxide was stored on the storage catalyst. At the end of this storage phase the catalyst temperature had dropped below 250° C.

During the storage phase, the concentration of nitrogen oxide in the exhaust gas before the catalyst (NOx,in) was approximately 330 ppm. At the beginning of the storage phase, no nitrogen oxide was leaving the catalyst (NOx,out) which demonstrates that all nitrogen oxide contained in the exhaust gas was trapped on the storage catalyst. But soon a leakage of nitrogen oxide was observed, of 180 ppm by the end of the storage phase. Then a pulsed regeneration was initiated comprising 5 rich pulses and 5 lean pulses. After regeneration, the nitrogen oxide concentration at the outlet of the catalyst was again zero, indicating complete regeneration of the catalyst. The storage phase and regeneration phase were repeated several times.

The lower diagram in FIG. 1 shows that the pulsed regeneration led to a temperature increase of the catalyst of up to 350° C.

Comparison Example 1

Figure 2:
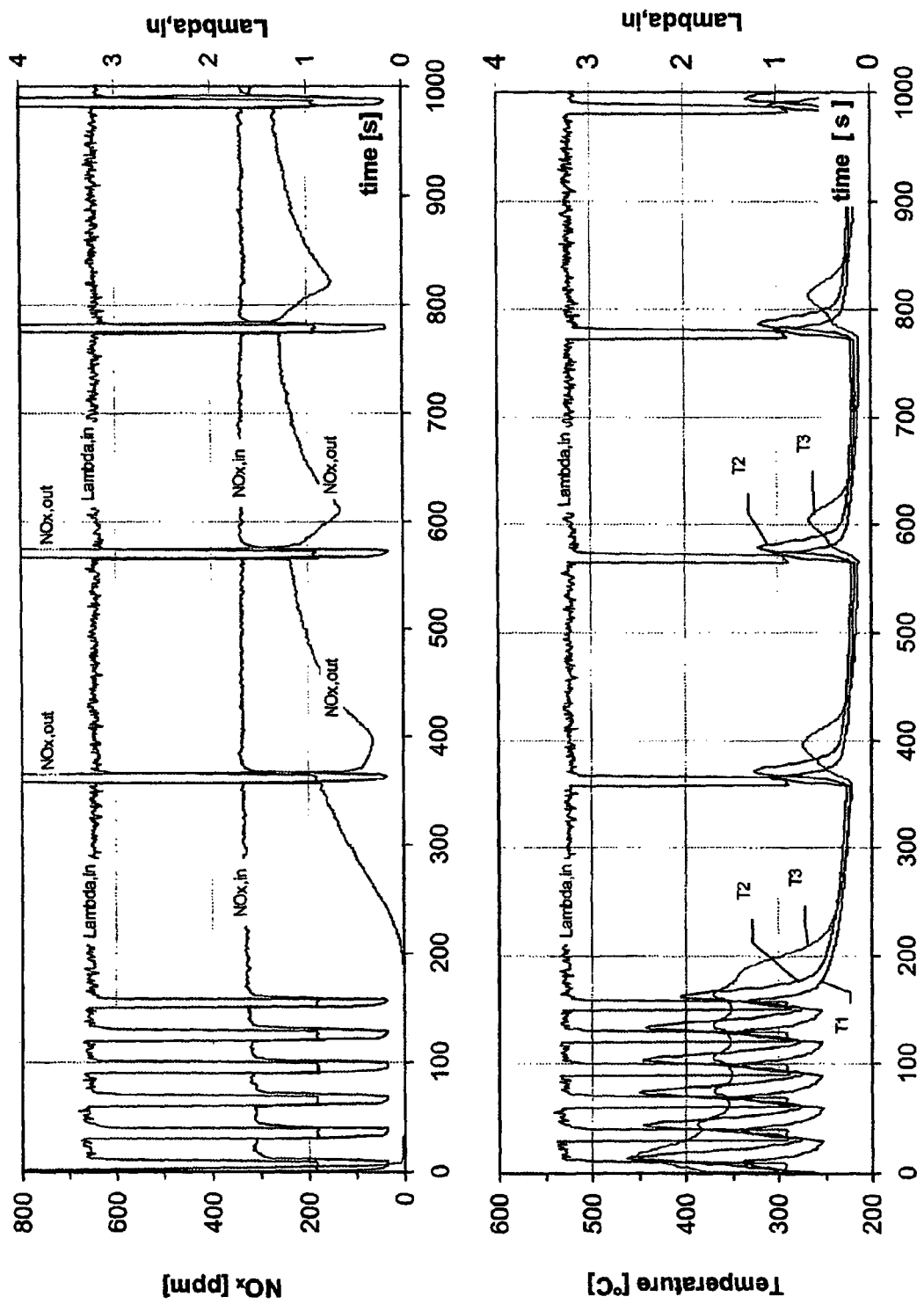
FIG. 2 illustrates operation of a nitrogen oxide storage catalyst arranged in the exhaust gas system of a diesel engine using conventional regeneration strategy at low exhaust gas temperatures.

The same test procedure was repeated, but with conventional regeneration. The regeneration period was set to 8 seconds, the maximum allowable period with rich air/fuel-ratio for this engine. The respective measurement scans are shown in FIG. 2. The upper diagram in FIG. 2 shows that from regeneration period to regeneration period, the storage catalyst gets less regenerated, and adsorbs less nitrogen oxides from the exhaust gas. This results in an increasingly enhanced concentration of nitrogen oxides at the outlet of the catalyst.

While the invention has been described in connection with specific embodiments, it is understood that further modifications are possible. This application is intended to cover variations, uses, or adaptations of the invention according to the general principles of the invention, and including those modifications apparent to one of skill in the art, as pertains to the features set forth in the appended claims.

We claim:

1. A process for regeneration of a nitrogen oxide storage catalyst having nitrogen oxides stored during a storage phase, wherein during said regeneration the stored nitrogen oxides are released and converted to nitrogen, said process comprising:
    (a) applying a first regeneration strategy when an exhaust gas temperature is above a threshold temperature, wherein said first regeneration strategy comprises changing a lean air/fuel-ratio to a rich air/fuel-ratio during a first regeneration period; and (b) applying a second regeneration strategy when the exhaust gas temperature is below said threshold temperature, wherein said second regeneration strategy comprises switching the air/fuel-ratio between a lean air/fuel-ratio and a rich air/fuel-ratio back and forth forming a sequence of rich pulses and lean pulses, and said sequence has between 2 and 10 rich pulses and between 2 and 10 lean pulses during a second regeneration period, wherein the threshold temperature is between 170° C. and 250° C.

2. The process according to claim 1, wherein in step (b) said lean air/fuel-ratio is between 1.5 and 4, and said rich air/fuel-ratio is between 0.8 and 0.98.

3. The process according to claim 2, wherein the duration of the first regeneration period is between 5 and 20 seconds.

4. The process according to claim 3, wherein the lean pulses have a pulse width of between 2 and 10 seconds, and the rich pulses have a pulse width of between 2 and 10 seconds.

5. The process according to claim 4, wherein the ratio of the pulse width of the lean pulses to the pulse width of the rich pulses is between 5:1 and 1:5.

6. The process according to claim 5, wherein the pulse width of the lean pulses is decreased stepwise or continuously from the beginning to the end of said second regeneration period, and the pulse width of the rich pulses is decreased stepwise or continuously from the beginning to the end of said second regeneration period.

7. A process for regeneration of a nitrogen oxide storage catalyst having nitrogen oxides stored during a storage phase, wherein during said regeneration the stored nitrogen oxides are released and converted to nitrogen, said process comprising:

(a) adsorbing nitrogen oxides contained in an exhaust gas by a storage catalyst during normal operating conditions of an engine;

(b) desorbing the nitrogen oxides and converting the nitrogen oxides to harmless substances by lowering an air/fuel-ratio to a rich air/fuel-ratio value during a regeneration period; and (c) switching the air/fuel-ratio back and forth between a lean air/fuel-ratio and a rich air/fuel-ratio forming a sequence of lean pulses and rich pulses, and said sequence has between 2 and 10 rich pulses and between 2 and 10 lean pulses during the regeneration period, when the exhaust gas is below a threshold temperature of between 170° C. and 250° C.

8. The process according to claim 7, wherein said lean air/fuel-ratio is between 1.5 and 4 and said rich air/fuel-ratio is between 0.8 and 0.98.

9. The process according to claim 8, wherein the lean pulses have a pulse width of between 2 and 10 seconds and the rich pulses have a pulse width of between 2 and 10 seconds.

10. The process according to claim 9, wherein the ratio of the pulse width of the lean pulses to the pulse width of the rich pulses is between 5:1 and 1:5.

11. The process according to claim 10, wherein the pulse width of the lean pulses is decreased stepwise or continuously from the beginning to the end of said regeneration period, and the pulse width of the rich pulses is decreased stepwise or continuously from the beginning to the end of said regeneration period.

* * * * *